(12) United States Patent
Lenz et al.

(10) Patent No.: US 7,539,609 B2
(45) Date of Patent: May 26, 2009

(54) CREATION OF A PROTOCOL STACK

(75) Inventors: Dirk-Holger Lenz, Brieselang (DE); Jens Kittan, Schwante (DE)

(73) Assignee: Tektronix, Inc., Beaverton, OR (US)

( * ) Notice: Subject to any disclaimer, the term of this patent is extended or adjusted under 35 U.S.C. 154(b) by 150 days.

(21) Appl. No.: 11/351,549

(22) Filed: Feb. 10, 2006

(65) Prior Publication Data

US 2006/0129375 A1 Jun. 15, 2006

Related U.S. Application Data

(63) Continuation of application No. 09/775,842, filed on Feb. 1, 2001, now abandoned.

(30) Foreign Application Priority Data

Feb. 23, 2000 (EP) .................................. 00103797

(51) Int. Cl.
G06F 9/455 (2006.01)
G06F 15/177 (2006.01)
G06F 15/173 (2006.01)
(52) U.S. Cl. .......................... 703/27; 709/220; 709/223
(58) Field of Classification Search .................. 703/27; 709/220, 223
See application file for complete search history.

(56) References Cited

U.S. PATENT DOCUMENTS 5,323,388 A * 6/1994 Chang et al. ................. 370/353
5,822,520 A 10/1998 Parker
5,892,763 A * 4/1999 Laraqui et al. ......... 370/395.53
5,897,609 A 4/1999 Choi et al.
5,903,754 A * 5/1999 Pearson ...................... 719/310
6,639,607 B1 * 10/2003 Ferguson et al. ............. 715/734

FOREIGN PATENT DOCUMENTS

| JP | 7-295907 | 11/1995 |
| JP | 9-275428 | 10/1997 |
| JP | 9-326796 | 12/1997 |

OTHER PUBLICATIONS

Bobby Krupczak, Kenneth L. Calvert, Mostafa H. Ammar, "Increasing the Portability and Re-Usability of Protcol Code" IEEE/ACM Transactions on Networking, vol. 5, No. 4, Aug. 1997, pp. 445-459.*

* cited by examiner

Primary Examiner—Paul L Rodriguez
Assistant Examiner—Dwin M Craig
(74) Attorney, Agent, or Firm—Michael J. Fogarty, III; Matthew D. Rabdau

(57) ABSTRACT

An apparatus for creating a protocol stack has at least one protocol layer with at least one standardized interface and an instance for the administration of the protocol stack. The protocol stack is created by making available the protocol layer(s), randomly compiling the protocol stack from the protocol layer(s), and making available an instance for the administration of the protocol stack using a graphical user interface.

14 Claims, 7 Drawing Sheets

CREATION OF A PROTOCOL STACK

CROSS-REFERENCES

This application is a continuation of prior application Ser. No. 09/775,842, filed Feb. 1, 2001 now abandoned.

BACKGROUND OF THE INVENTION

The present invention relates to protocol testing, and more particularly to a method for creating a protocol stack and to a protocol tester using the method.

The field of protocol measurement technology is a highly innovative one. After each new or further development of telecommunication or network protocols, manufacturers and operators of network and telecommunication equipment face the problem of having to check the functioning and conformance of the new systems. Because of competition each manufacturer tries to launch its product on the market as early as possible. This pace of development places special demands on manufacturers of protocol testers.

In order to keep testing times for their systems as short as possible and minimize the scope of protocol knowledge that test personnel need to have, manufacturers often use protocol emulations on their protocol test systems. In practice emulations of a protocol are often prepared so that the emulations copy individual protocol layers. Connecting the individual protocol layers to form an emulation system thus allows copying entire protocol stacks or selected parts of a protocol stack. The individual protocol layers are viewed abstractly and in this way transmit data from layer to layer. To this end so-called primitives are often used in protocol specifications to describe the communication between protocol layers. Creating such protocol emulations involves a great deal of work.

In many cases new protocol stacks consist entirely or almost entirely of protocol layers already known. But also in these cases it is necessary to compile a new application for the protocol test system. At this point a great deal of flexibility is desired for as simple a procedure as possible for the modification of protocol stacks.

According to the state of the art it has, until now, been standard practice for protocol systems that have the capability of simulating and using protocol emulations for this purpose to offer static applications, i.e., the user calls up and uses ready-made applications. In this connection reference is made to the ISO/IEC 10731:1994 Open Systems Interconnection (OSI) reference model, the contents of which are herein incorporated by reference. In this case it is not possible for the user to modify the protocol stack by adding, replacing or removing protocol layers. Preparing a new application, i.e., putting together existing protocol layer emulations, requires special system know-how and knowledge of communication mechanisms used, and usually is only done by the manufacturer. For the protocol tester this creates the problem that the tester will only encounter a limited number of applications, each with a specific constellation of protocol emulations.

Other solutions, such as stream concepts, have not prevailed in protocol test systems. Stream concepts may only be used where there is an exact layering system with one protocol layer location on top of another. As soon as there are several protocols on the same level and cross relationships between different levels become necessary or relationships extend beyond two levels, this technology may no longer be applied.

What is desired is a method that allows a user of a protocol tester to put together existing emulations of protocol layers in a flexible and simple manner to form a protocol stack so that the user requires little previous knowledge of the protocols.

BRIEF SUMMARY OF THE INVENTION

Accordingly the present invention is a method of creating protocol stacks that has at least one protocol layer with at least one standardized interface and has an instance for the administration of the protocol stack which contains such a protocol layer. A standardized, generic emulation environment is made available that allows a user to integrate protocol layer emulations as required into a protocol stack and/or connect the protocol layer emulations with other protocol layer emulations, script interpreters or control components. Equipping protocol layers with standardized interfaces creates the possibility of connecting protocol layers with each other in a simple manner or connecting protocol layers with script interpreters or control components. Standardization of the interfaces also makes it possible for a user to require only little previous knowledge to put together a protocol stack.

In the process each protocol layer and/or each script interpreter is assigned a description file in which at least one characteristic of the protocol layer and/or script interpreter is described. When a protocol stack is put together, the description files are automatically linked with one another. This is done by the above instance for the administration of the protocol stack or by a separate device. In this process the instance or separate device provides a generic communication and administration mechanism for the protocol emulations. The instance preferably has at least one local emulation manager that is assigned to at least one protocol layer and a global emulation manager that is linked to each local emulation manager.

Each protocol layer preferably features at least one so-called Service Access Point (SAP), with each SAP providing an input and/or output to another SAP. SAP is the logical point of access to a protocol layer into which data flow (receiving) or from which data are made available (sending) by the protocol tester. When applied to protocol emulation the inputs and outputs of the emulations are referred to as SAPs. Depending on the functions of these inputs and outputs, different types of information are expected. Two protocol emulations are linked by connecting the appropriate SAPs of these emulations. In these links a sending SAP of one emulation is connected to a receiving SAP of the other emulation. Both SAPs handle the same kind of data.

Each protocol layer preferably features an input and an output to connect with the instance, particularly to the local emulation manager. It is possible to configure a protocol layer so that it may be connected with at least two higher protocol layers and/or at least two lower protocol layers. The characteristics stored in the description files have a description of the SAP, particularly by way of a list of primitives that may be exchanged via the relevant SAP, and have adjustable and/or constant protocol layer parameters as well as protocol layer actions. To minimize the amount of previous knowledge a user needs to have, in an especially preferred embodiment the primitives of each protocol layer are allowed to be illustrated by way of standardized structures and standardized coding. The SAPs take on the same form as the instance by using communication functions.

In a preferred embodiment an interaction element, i.e., a script interpreter, is used via which a user may interact with at least one protocol layer. A graphical user interface (GUI) may be used via which the user may put together the protocol stack. The GUI provides protocol layer-specific information, with the user being able to modify in particular adjustable and/or constant parameters of the protocol layer and/or actions of the protocol layer. The modifications made by the user are taken into account in the description files. After entry by the user, the current description files are put together by the instance or an additional device as desired to form the protocol stack without requiring any further action on the part of the user.

Therefore a method for creating a protocol stack involves in a first step a protocol layer with at least one standardized interface being made available. In a second step the protocol stack having at least one such protocol layer is randomly put together. In a third step an instance for the administration of the protocol stack is made available.

The objects, advantages and other novel features of the present invention are apparent from the following detailed description when read in conjunction with the appended claims and attached drawing.

DETAILED DESCRIPTION OF THE INVENTION

Figure 1:
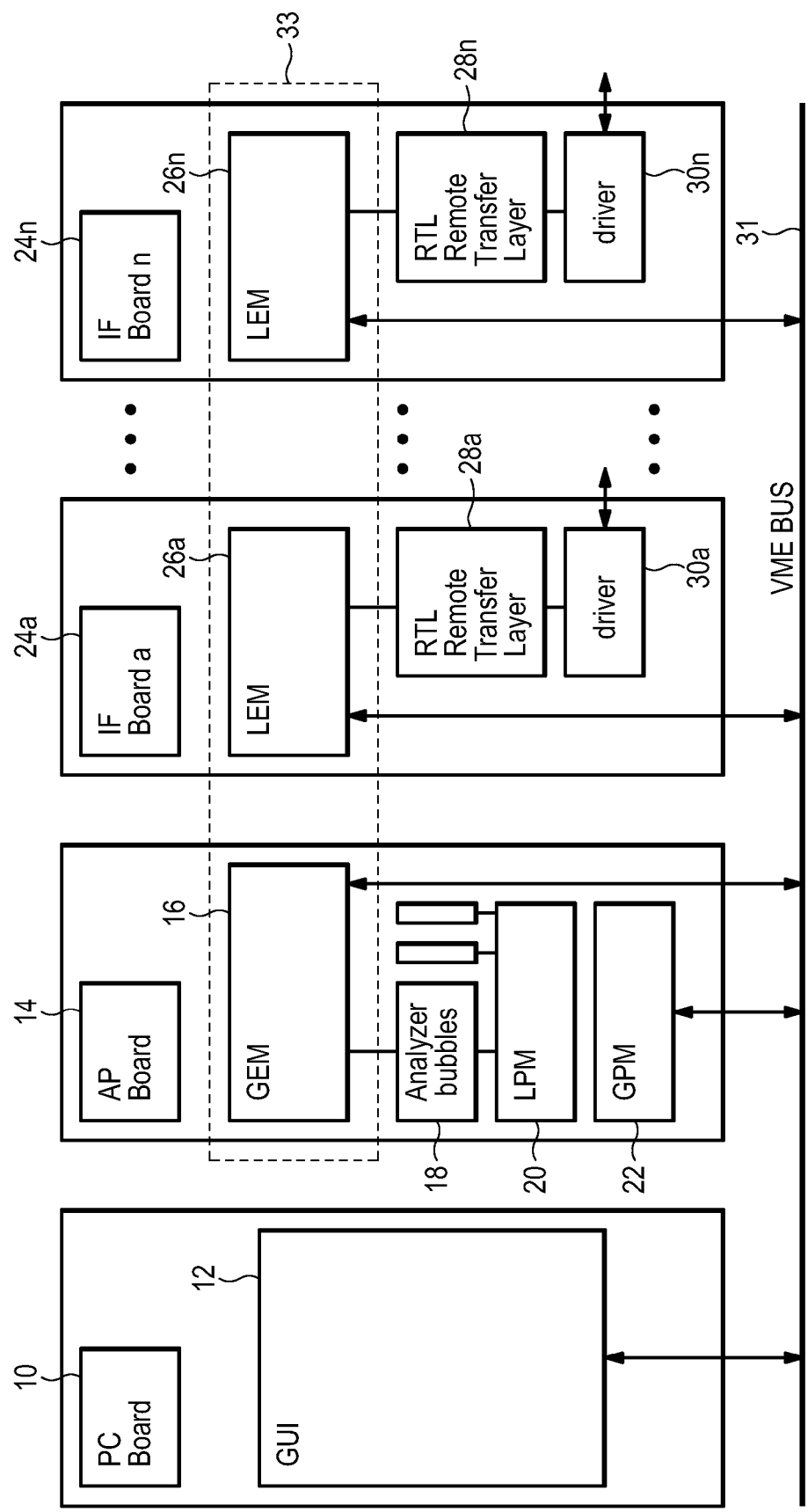
FIG. 1 is a block diagram view representing the interaction of specific components of a protocol tester according to the present invention.

Referring now to FIG. 1 components of a protocol tester are shown, including a personal computer (PC) board 10, such as an Intel Pentium 133 central processing unit (CPU) with a Windows NT 4.0 operating system, a random access memory (RAM) and a hard disk. The protocol tester also includes a graphical user interface (GUI) 12 and an application board 14, such as an application processor card having a Motorola 68040 CPU with a vxWorks realtime operating system and a RAM. The application board 14 contains a global emulation manager 16, analyzer bubbles 18 and a local and a global pipeline manager 20, 22. The protocol tester further contains several, preferably six, interface boards 24a-24n, for example for E1/T1 , S0/U2B1Q/V/X and ATM interface standards, which interface boards may use either a Motorola 68040 or an Intel 960 CPU with a vxWorks operating system. Each interface board 24 features a local emulation manager 26, a remote transfer layer 28 and a driver 30. All boards 10, 14, 24 communicate via a VME bus 31. An emulation management layer 33 is formed from the local emulation managers 26 and the global emulation manager 16. The emulation management layer 33 serves to control cooperation, installation and configuration of a protocol stack. To enable easy compilation of the protocol stack and to be independent from the operating system, the interface boards 24 have a uniform, standardized configuration.

Figure 2:
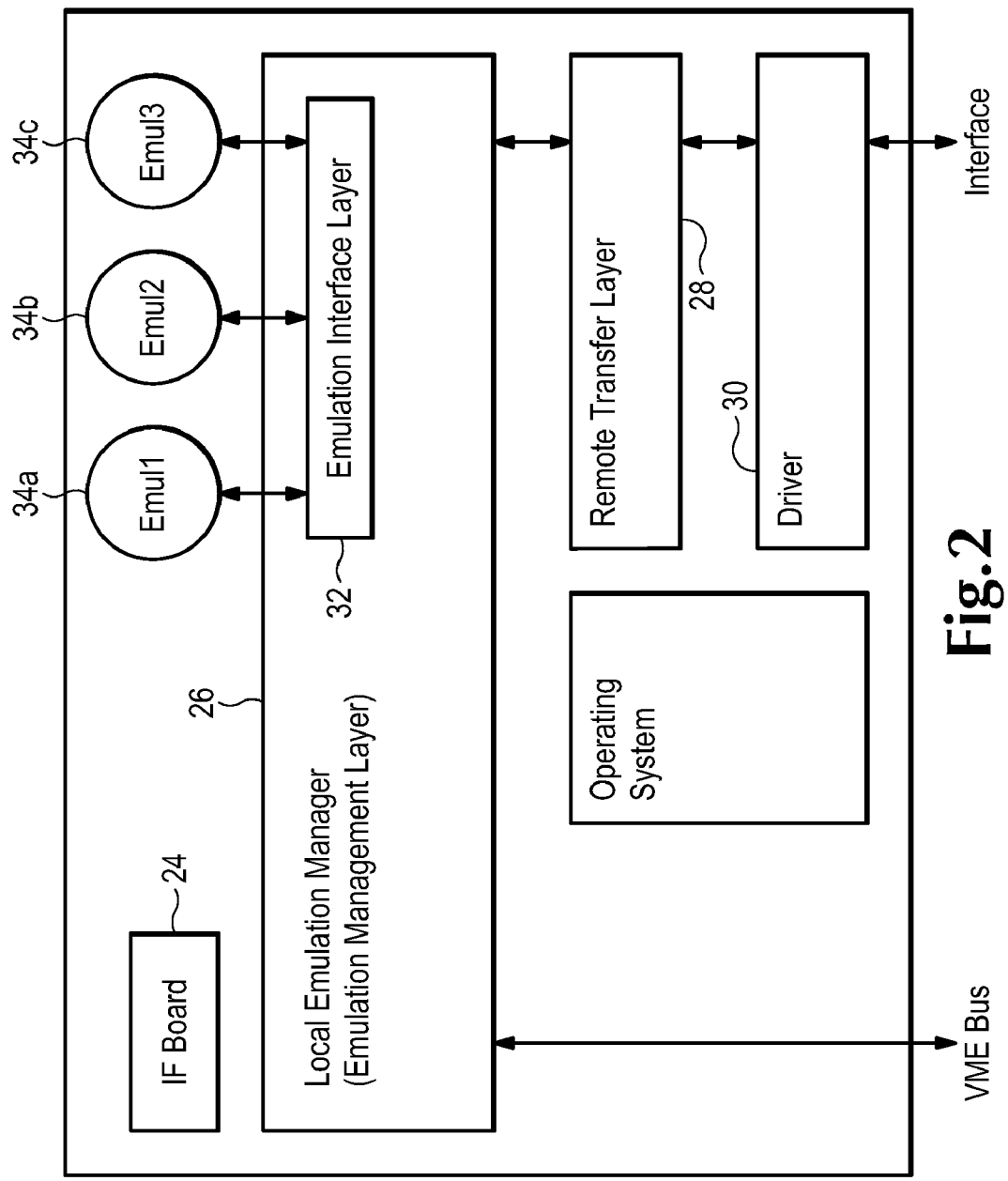
FIG. 2 is a block diagram view representing an interface board of the protocol tester according to FIG. 1.

FIG. 2 shows an interface board 24 with a local emulation manager 26 having an emulation interface layer 32 that constitutes an abstraction layer between the operating system and each emulation 34a-34c. It provides an interface for logical communication paths to the emulations 34 using external queues for their implementation. The emulation interface layer 32 provides the emulations 34 with functions to assign storage, allocate buffers, start and stop timers, and send sequence tracking messages. Only for the installation and deinstallation of the emulations 34 does emulation interface layer 32 import functions to initialize and deinitialize the emulations and to start the emulation.

Administrative queries to the global emulation manager 16 serve the purpose of creating or deleting an emulation 34 within a specified protocol stack, i.e., viewed at the emulation level within an emulation pipeline configuring or querying parameters of the emulation, querying a menu system for emulation parameters and connecting communication paths between emulations. Each administrative query to the local emulation manager 26 is carried out by a function call and an ASCII string, which is easily readable. Administrative queries from the user side to local emulation managers 26 are handled, as far as possible, without any interruption of the emulation 34. Generally one such emulation 34 may have one or several protocol layers.

Figure 3:
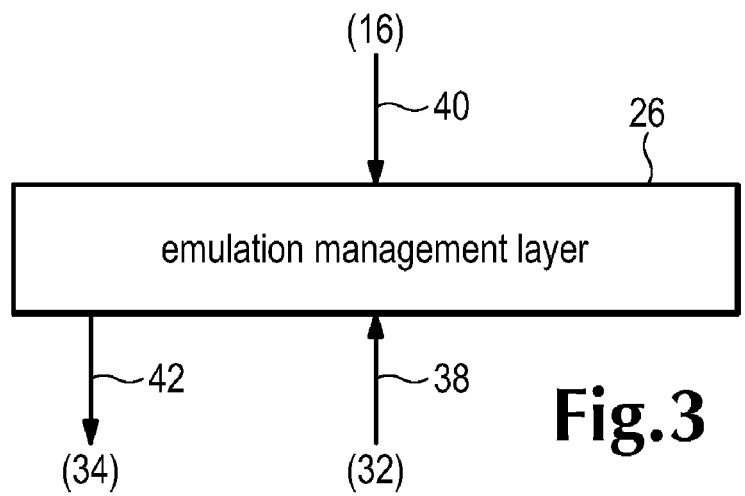
FIG. 3 is a schematic diagram view representing an emulation management layer according to the present invention.

FIG. 3 shows a local emulation manager 26 that is connected to the emulation interface layers 32 of the individual emulations 34 via an input 38, and to the global emulation manager 16 via an input 40 for taking over functions, for installing and configuring the protocol stack, and for events that come from outside, i.e., from the user. Via an output 42 the emulation manager 26 may initialize, deinitialize and start an emulation.

Figure 4:
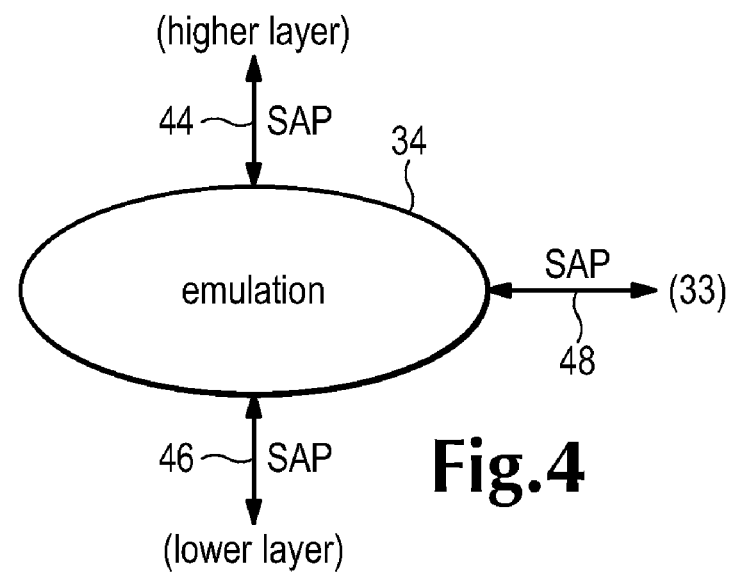
FIG. 4 is a schematic diagram view representing possible outputs and inputs of an emulation according to the present invention.

FIG. 4 shows an emulation 34 that may have one or several protocol layers. Via standardized SAPs links to an interface located at a higher level via line 44, to an interface located at a lower level via line 46, and to the emulation management layer 33 via line 48 are possible. Here interface is understood as further protocol layers, emulations 34 and script interpreters.

The SAPs of the individual interfaces may be connected by the user in any way. For details of the realization of the link, see below. Administrative commands to the administration instance, i.e., the emulation management layer 33 formed from the global and local emulation managers 16, 26, are formulated by readable ASCII strings. The following keywords are defined for a request string:

create<emulname>[,<createname>[,<searchpath>]]

This keyword is used to request the interface layer 32 to load an emulation 34 known as <emulname>. If the parameter <createname> is given, the emulation gets this name within the emulation pipeline, else the emulation has the name <emulname> within the pipeline. No emulation has a name with a digit as the first character because this is an identification for an output or input link to a physical interface. If the parameter <searchpath> is given, an object module is searched within the directory of the given search path.

unload<emulname>

Within the emulation pipeline an emulation, which is named in the pipeline by the given name <emulname>, is searched for. If the emulation is found, it is deleted from the pipeline

```
connect<emulname1>.<output1>,<emulname2>.<input2>
connect<logical_link_identifier>,<emulname2.<input2>
connect<emulname1>.<output1>,<logical_link_identifier>
connect<boardnumber1>.<boardlink1>,<emulname2>.<input2>
connect<emulname1>.<output1>,<boardnumber2>.<boardlink2>
connect<boardnumber1>.<boardlink1>,<logical_link_identifier>
connect<logical_link_identifier>,<boardnumber2>.<boardlink2>
```

The connect keyword is used to make connections between:
- an output of an emulation and an input of another emulation;
- a logical link of a physical interface (referenced by the logical input link identifier as a number) to an input of an emulation;
- an output of an emulation to a logical output link of a physical interface (referenced by the logical link identifier as a number);
- an interboard connection (that has the local board number and a link number 0 . . . 31 of the board);
- an output of an emulation to an interboard connection (having the local board number and a link number for the board);
- an interboard connection (having the local board number and a link number to the board) to a logical output link of a physical interface (referenced by the logical link identifier as a number);
- a logical link of a physical interface (referenced by a logical input link identifier as a number) to an interboard connection (having the local board number and a link number of the board).

Note that no emulation has a name with a digit as the first character because this is an identification for an output or input link to the physical interface.

```
disconnect<emulname>.<output>
disconnect<logical_link_identifier>
disconnect<boardnumber>.<boardlink>
```

The disconnect keyword is used to remove an existing connection which is outgoing from
- one emulation, e.g. going to another emulation;
- a logical link referenced by a logical link identifier as a number;
- an interboard connection by the number of the board and the interboard link.

Only the originator of the connection has to be given.

config<emulname>.<parametername>=<value>
   This keyword is used to configure an emulation. The name of the emulation is given by <emulname>, the parameter of the emulation that has to be configured is given by <parametername>, and the value to be put into the parameter is given by <value>.

query<emulname>.<parametername>
   This keyword is used to ask the emulation management layer 33 for the value of a parameter that is used by the given emulation. The name of the emulation is given by <emulname> and the name of the parameter is given by <parametername>. The emulation management layer sends a response message consisting of an ASCII string to the querying application.

list
   The list keyword is used to request the emulation management layer 33 to send back a list of emulation pipelines. The emulation management layer sends the response message consisting of a readable ASCII string to the asking application.

show[<emulname>]
   This command is used to get information concerning one emulation pipeline. It is possible to give the name of an emulaton <emulname> of the pipeline, then the response information is reduced to the one emulation. The response to this command has the following format:

```
<modulename> loaded as <emulationname>
<outputname1> -> <destination1>
. . .
<inputname1> <- <source1>
. . .
```

The emulation that is running using the module of the name <modulename> is named a <emulationname> within the pipeline.

The emulation has several output links and input links. These links are named <outputname1> . . . <outputnameX> and <inputname1> , , , <inputnameX>. Each output is concatenated to a destination. The destination is declared with <destination1> . . . <destinationX>. Each input link is concatenated with a source line. These source lines are names <source1> . . . <sourceX>.

The definition of a destination may have one of the following syntax formats:

```
<destinationemulation>.<destinationinput>
LDD (= Logical Data Destination)
AP (= application that may be connected)
```

If the destination of the output link is an emulation, then the name of the remote emulation (destinationemulation> and the name of the remote input <destinationinput> are given. If the output link is directly coupled to the application or the logical data destination, this is given by the words LDD or AP.

The definition of a source may have one of the following syntax formats:

```
<sourceemulation>.<sourceoutput>
LDS (= Logical Data Source)
AP
```

If the source to the input link is an emulation, then the name of the remote emulation <sourceemulation> and the name of the remote output <sourceoutput> are given. If the input link is directly coupled to the application or the logical data source, this is given by the words LDS or AP.

menu<emulname>
   This command is used to get information concerning the configuration and query functionalities of the emulation with the name <emulname>. The given information may be used to show a comfortable menu structure to the user. The responses to this command define variables and submenus. Variables or submenu declarations are separated into lines. The responses to this command have the following keywords:

```
<name>:
    type = int<min>...<max>;
    access = <access>;
    default = <default>;
```

The variable is of type integer. The name of the variable is given by <name>. The integer value of the variable is in the range of <min> to <max>.

```
<name>:
    type = enum<value1>/<value2>/...;
    access = <access>;
    default = <default>;
```

The variable is of type enumerate. The name of the variable is given by <name>. The possible values of the variable are given with the list of <value1>, <value2>, etc.

```
<name>:
    type = string<length>;
    access = <access>;
    default = <default>;
```

The variable is a string of ASCII characters. The name of the variable is given by <name>. The length of the string is given by <length>.

```
<name>:
    type = numbers<length>;
    access = <access>;
    default = <default>;
```

The variable is a string of number ('0' ... '9') characters. The name of the variable is given by <name>. The length of the string is given by <length>.

```
<name>:
    type = hexnumbers<length>;
    access = <access>;
    default = <default>;
```

The variable is a string of hexadecimal number ('0' ... '9','a' ... 'f') characters. The name of the variable is given by <name>. The length of the string is given by <length>.

```
<name>:
    type = telnumbers<length>;
    access = <access>;
    default = <default>;
```

The variable is a string of telephone number ('0' ... '9', 'a' ... 'z','#','*') characters. The name of the variable is given by <name>. The length of the string is given by <length>.

```
<name>:
    type = bitstring<length>;
    access = <access>;
    default = <default>;
```

The variable is a number of bits. Each bit is modified by one digit ('0' or '1') of a given string. The length of the string is given by <length>.

Each variable is associated with an access class <access> of the type 'rd' (read only), the type 'wr' (write only) or the type 'rdwr' (read and write) that is given as a parameter after the variable type declaration. Every variable may be arranged as a field. In this case the name of the variable is extended by an index declaration. Each index declaration is enclosed in brackets '[' and ']'. The type of an index specification may be a normal integer number or an enumeration number. Definition:

<namestring>[int<min> ... <max>]:
    In this case the index to the variable name <namestring> is of the type integer. The range of the variable is given by <min> ... <max>.

<namestring>[enum<value1>/<value2>/ ... ]:
    In this case the index to the variable of the name <namestring> is of the type enumerate. The possible values of the index are given as a list of <value1>, <value2> ...

It is possible to allocate a structure of submenus into the menu. The syntax for a submenu is of the following format:

```
<name>:    {
            [<variabledeclarations>]
            [<menudeclarations>]
           }
```

The name of the submenu is given by <name>. The variables of further submenus belonging to the actual declared submenu are enclosed into brackets '{'and'}'.

bindreq<emulname>.<input>[,<data>]
    This command is used to pass a bind request primitive to an input of an emulation. The emulation is given by its name <emulname> and by its input link <input>. The primitive is filled with data of the optional parameter <data> in hexadecimal format.

sendreq<emulname>.<input>,<primId>[,<data>]
    This command is used to pass a primitive to an input of an emulation. Ths emulation is given by its name <emulname> and by its input link <input>. It generates a primitive with the given identifier <primid> and the primitive is filled with data of the optional parameter <data> in hexadecimal format.

exec<filename>
    This command is used to request the emulation management layer 33 to read the command string for the upper interface from the file given by the <filename>.

board<boardnumber>:<request>
    This command is used to route a request <request> to the board given by <boardnumber>.

As mentioned above the administration instance formed by the local and global emulation managers 16, 26, hereinabove also referred to as the emulation management layer 33, provides a generic communication and administration mechanism for emulation. The purpose of this administration instance is to load into an abstract structure, i.e., the emulation pipeline, the protocol emulations, the script interpreters and the control components required for the protocol stack or the desired part of the protocol stack and to connect them. This loading and connecting may be controlled by the user at the protocol tester independently and without in-depth knowledge of the protocol system structure. For this control a GUI or text file may be used.

The description files assigned to the protocol layers or protocol emulations allow the GUI to display information on the protocol emulations. This information includes:

a general description of the protocol emulation, the script interpreter or the control component;

the names of all existing SAPs for the input and output directions;

a description of each individual SAP;

a list of the primitives that may be exchanged via each individual SAP;

a description of all primitives;

a list of the parameters for each individual primitive;

a description of all parameters used in primitives;

a description of the variables, constants and actions that may be set, queried or started within the protocol emulation, with this description also enabling the grouping into menus, submenus and fields;

and additional details for statistical functions.

The generic concept of the administration instance and the information from the description files allow the user to put together in a comfortable manner on the test system modules for the desired applications. This flexibility increases the use value of the protocol test system for many applications, saves considerable development efforts, and reduces delays in the test progress.

The information made available in the description files may also be used by other tools in the protocol tester to better guide the user and support the user with protocol-specific knowledge when the test cases are created. The description file that is available for each protocol emulation, for each script interpreter and for each control element is in the text format. The following is an excerpt from such a file, the contents of which are easily disclosed to an expert in the field of the present invention:

[General]

```
Name = ss7isup1;
Description = "ISDN User Part";
Type = Emulation;
```

{Statistic]

```
Statistic Module: type=enum ON/OFF; access=rdwr; default=OFF;
Statistic Interval: type=int 1 . . . 3600; access=rdwr; default=10;
```

[Menu]

```
General: {
Version: type=string 80; access=rd; comment=" "; statistic=N/A;
  default="SS7 ISUP V1.00";
State: type=enum
```

-continued

```
  NOT_LOADED/IDLE/ACTIVE/WARNING/ERROR/
  NO_ANSWER;
  access=rd; comment=" "; statistic=N/A; default=NOT_LOADED;
State Description: type=string 256; access=rd; comment=" "; statistic=N/A;
  default=emulation not loaded;
Standard: type=enum White Book ISUP; access=rdwr; comments=" ";
statistic=N/A;
  default=White Book ISUP;
}
Networks: {
  Network nat0: {
    use:    type=enum no/yes; access=rdwr; comment=" ";
            statistic=N/A; default=no;
    NI:     type enum nat0/nat1/int0/int1; access=rd; comment=" ";
            statistic=N/A; default=nat0;
    OPC:    type=int 0. . .16383; access=rdwr; comment=" ";
            statistic=N/A; default=0;
  }
```

[SAPs]

```
Network nat0:          mode=in; location=lower;comment=" ";
                       asps=UDAT_IND
Network int1:mode=in; location=lower; comment=" ";
Call Terminal:         mode=in; location=upper; comment=" ";
                       asps=DATA_REQ;
Maintenance Terminal: mode=in; location=upper; comments=" ";
                       asps=RESET_REQ, RESET_RES,
                       CONTRECHECK_REQ, STOP_REQ,
                       BLOCKING_REQ, BLOCKING_RES,
                       UNBLOCKING_REQ,
                       UNBLOCKING_RES;
Network nat0:          mode=out; location = lower; comment=" ";
                       asps=UDAT_REQ;
Network int1: mode=out; location=lower; comment=" ";
                       asps=UDAT_REQ;
Call Terminal:         mode=out; location=upper; comment=" ";
                       asps=DATA_IND;
Maintenance Terminal: mode=out; location=upper; comment=" ";
                       Asps=RESET_IND,
                       RESET_CNF,CONTRECHECK_CNF,
                       STOP_CNF,
                       BLOCKING_IND, BLOCKING_CNF,
                       UNBLOCKING_IND, UNBLOCKING_CNF,
                       STARTRESET_IND, CALLFAILURE_IND,
                       MAINTENANCE_IND;
```

[ASPs]

```
RESET_REQ:          id=0X0001; comment=" "; para1=N1;
                    para2=DPC; para3=CIC;
RESET_RES:          id=0x0002; comment=" "; para1=N1;
                    para2=DPC; para3=CIC;
CONTRECHECK_REQ:    id=0x0003; comment=" "; para1=N1;
                    para2=DPC; para3=CIC;
```

[PRMS]

```
N1:     comment=" "; size=2; values=nat0=2/nat1=3/int0=0/int1=1;
        default=2
DPC:    comment=" "; size=2;
OPC:    comment=" "; size=2;
CIC:    comment=" "; size=2;
```

Figure 5:
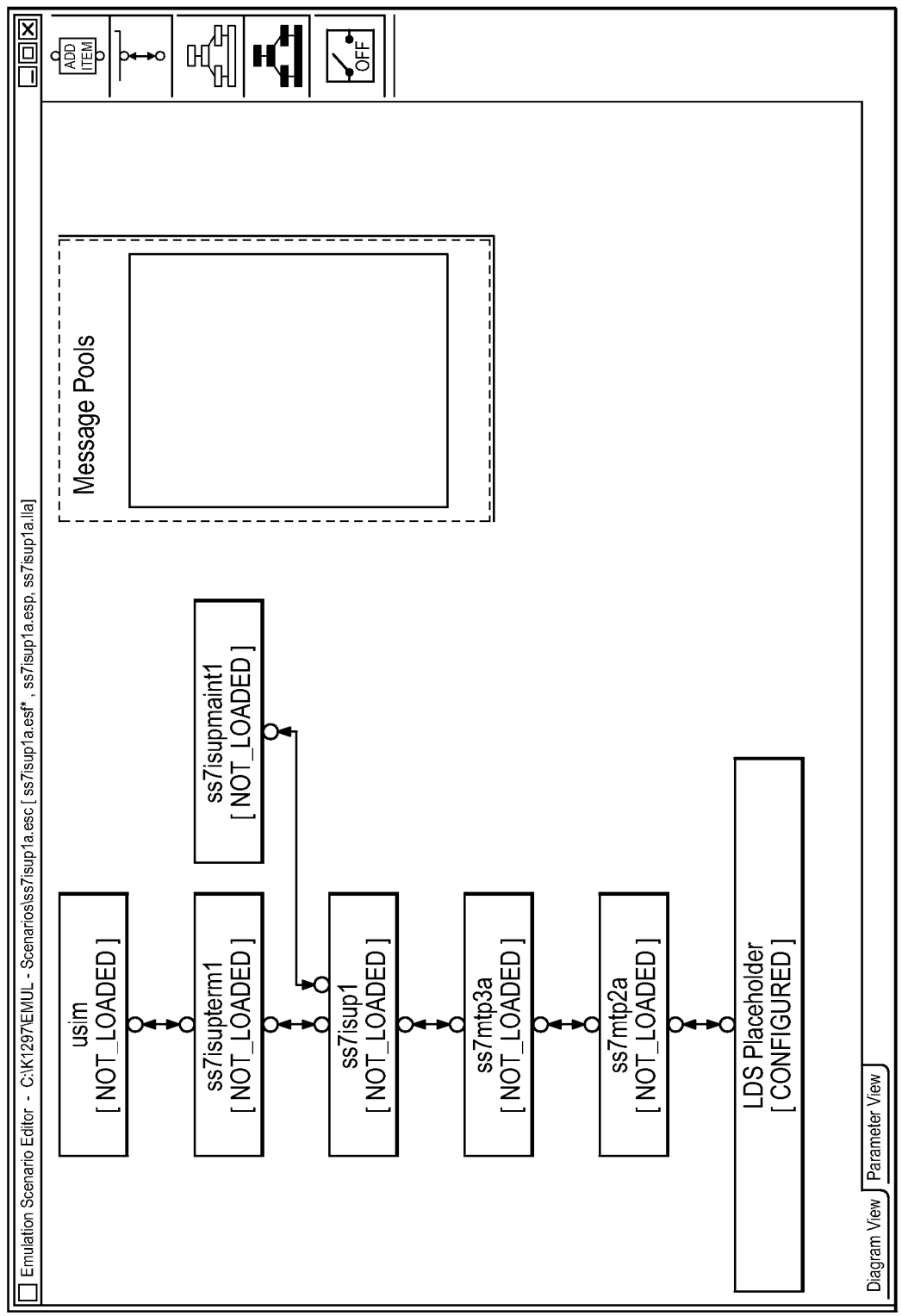
FIG. 5 is a plan view of a first user interface of a protocol stack editor according to the present invention.

As part of the GUI of the embodiment example an editor is made available that supports a user in putting together the protocol stack. FIG. 5 shows a first user interface screen of the editor, the so-called Diagram View screen, as an example of a generically functioning user interface. On the right-hand side of the user interface screen the user may select control functions with which a protocol stack may be created. On the left-hand side of the user interface screen one may see a protocol stack, with the layer ss7isup1 having two layers arranged above it in a parallel fashion, namely layers ss7isupterm1 and ss7isupmaint1.

Figure 6:
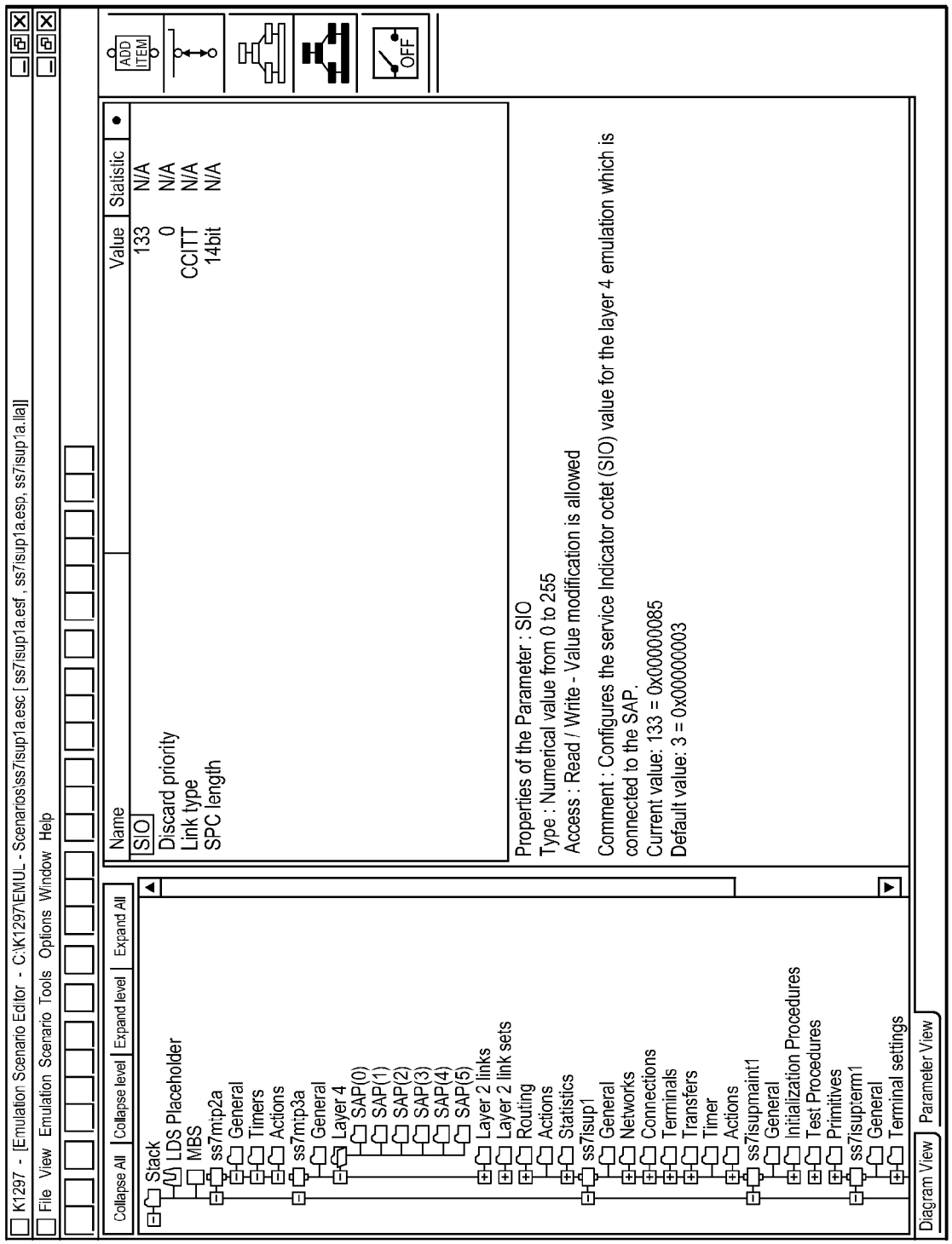
FIG. 6 is a plan view of a second user interface of the protocol stack editor according to the present invention.

FIG. 6 shows a second user interface screen of the protocol stack editor, which is the Parameter View user interface screen. Here variables, constants and actions of protocol layer emulations may be processed. The window in the left part of the screen shows first a stack directory that has various protocol layers, such as ss7mtp2a, ss7mtp3a, ss7isup1, etc. arranged at a lower level. Within each layer several directories may be selected, such as General that covers general aspects, Timers for time markers and Actions for specific actions. For layer ss7mtp3a the individual SAPs are in the layer 4 subdirectory. Under layer ss7isupmaint1 primitives may be selected. The two partial windows on the right-hand side show information of SAP(0) of layer 4 of the protocol layer ss7mtp3a.

Figure 7:
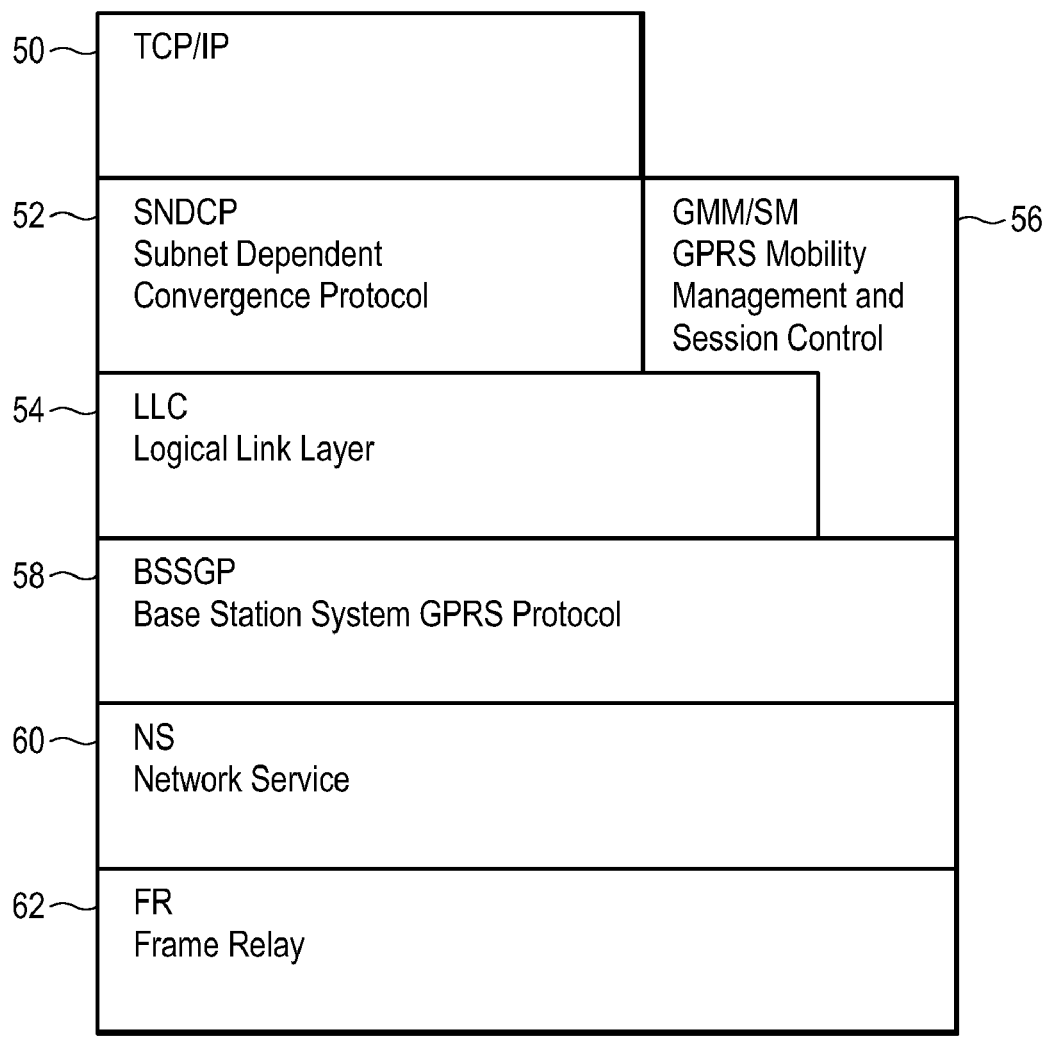
FIG. 7 is a block diagram view representing a protocol stack that may be realized according to the present invention.

FIG. 7 shows another representation of the protocol stack. From top to bottom the following layers are linked:

TCP/IP 50;

SNDCP (subnet dependent convergence protocol) 52;

LLC (logical link layer) 54;

In parallel with SNDCP 52 and LLC 54: GMM/SM (GPRS mobility management and session control) 56;

BSSGP (base station system GPRS protocol) 58;

NS (network service) 60;

FR (frame relay) 62.

The protocol stack shown is taken from the Gb interface of GPRS. Protocol layers FR, NS, BSSGP and LLC are grouped together on the protocol tester within a single emulation named LLC/BSSGP/NS/FR. Protocol layer GMM/SM is simulated by way of a FORTH script. The TCP/IP packets are stored in a load generator that is capable of continuously sending packets.

Figure 8:
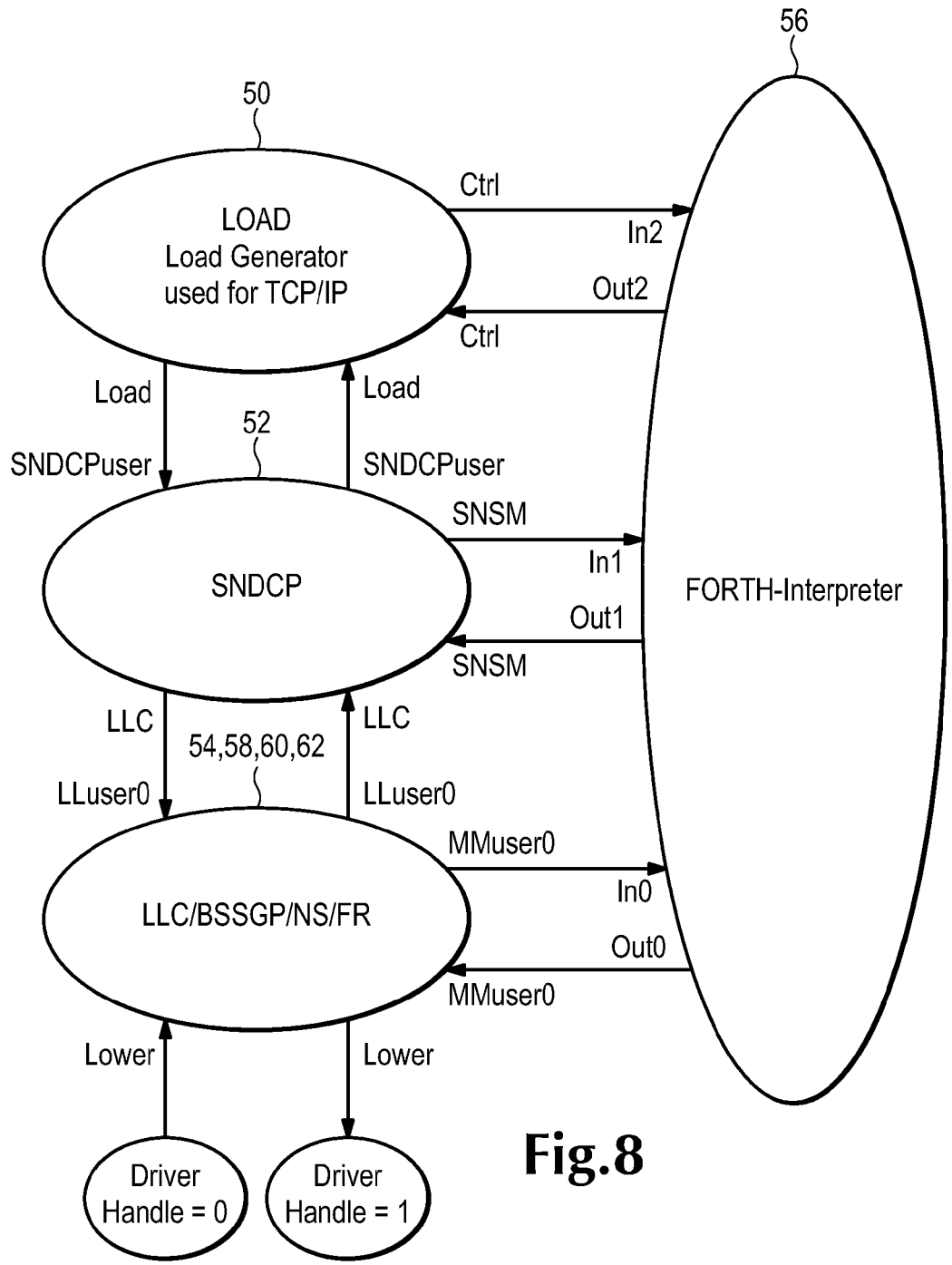
FIG. 8 is a detailed flow diagram view representing the interactions of the protocol stack according to FIG. 7.

FIG. 8 shows in more detail the interactions of the individual protocol layers of the protocol stack shown in FIG. 7. To create the protocol stacks of FIGS. 7 and 8 one only has to give the following administrative commands to the administration instance:

```
create LLC1
create SNDCP
create LOAD
create FORTH1197, FORTH
connect LOAD.Load,SNDCP.SNDCPuser
connect SNDCP.SNDCPuser,LOAD.Load
connect LOAD.Ctrl,FORTH.In2
connect FORTH.Out2,LOAD.Ctrl.
connect SNDCP.LLC,LLC1.LLuser0
connect LLC1.LLuser0,SNDCP.LLC
connect SNDCP.SNSM,FORTH.In1
connect FORTH.Out1,SNDCP.SNSM
connect LLC1.MMuser0,FORTH.In0
connect FORTH.Out0,LLC1.MMuser0
connect LLC1.Lower,1
connect 0,LLC1.Lower
```

Thus the present invention provides a method of creating protocol stacks that is flexible and does not require extensive knowledge by the user of the protocols involved.

What is claimed is:

1. An apparatus for creating a protocol stack, comprising:
   a processor;
   a memory;
   a graphical user interface, for putting together the protocol stack;
   a global emulation manager;
   a plurality of local emulation managers;
   wherein said memory stores computer executable instructions that when executed by the processor perform the following;
   generate a protocol layer with a standard interface;
   generate an instance in said graphical user interface, for the administration of the protocol stack that contains said protocol layer, said instance having a local emulation manager assigned to said protocol layer and said global emulation manager linked to said local emulation manager.

2. The apparatus as recited in claim 1 wherein the protocol layer comprises a description file in which a characteristic of the protocol layer is described.

3. The apparatus as recited in claim 2 farther comprising means for linking the description files of components of the protocol layer with each other.

4. The apparatus as recited in claim 1 wherein the protocol layer has a Service Access Point, with the Service Access Point having an input and/or an output to another Service Access Point.

5. The apparatus as recited in claim 1 wherein the protocol layer comprises an input and an output to connect with the local emulation manager.

6. The apparatus as recited in claim 1 wherein the protocol layer is configured to be connected with at least two higher protocol layers and at least two lower protocol layers.

7. The apparatus as recited in claim 2 wherein the characteristic comprises:
   a description of a Service Access Point as a list of primitives that may be exchanged via the Service Access Point; and
   parameters of the protocol layer; and
   actions of the protocol layer.

8. The apparatus as recited in claim 7 wherein the primitives are shown as standardized structures and standardized coding.

9. The apparatus as recited in claim 7 further comprising a communication function for giving the Service Access Point the same form as the instance.

10. The apparatus as recited in claim 1 further comprising an interaction element via which a user interacts with the protocol layer.

11. The apparatus as recited in claim 10 further comprising a script interpreter that is incorporated by the interaction element into the protocol stack so that the user acts on the protocol stack.

12. The apparatus as recited in claim 1 wherein protocol-layer-specific information is made available via the graphical user interface.

13. The apparatus as recited in claim 12 wherein the protocol-layer-specific information comprises:
   adjustable and constant parameters of the protocol layer; and
   actions of the protocol layer, the parameters and actions being modifiable by the user.

14. An apparatus for creating a protocol stack comprising:
a plurality of local emulation managers, each local emulation manager being coupled to a protocol layer emulation with the protocol layer emulation having a standardized interface;
a global emulation manager linked to the local emulation managers to form an administration instance; and
a graphical user interface for interacting with the administration instance to provide administrative commands for loading and connecting elements including the protocol layer emulations to create the protocol stack.

* * * * *